Dec. 15, 1953          L. HUNTER, JR          2,662,396
                   WHEEL BALANCING DEVICE
Filed Aug. 11, 1949                          6 Sheets-Sheet 1

Dec. 15, 1953 L. HUNTER, JR 2,662,396
WHEEL BALANCING DEVICE
Filed Aug. 11, 1949 6 Sheets-Sheet 3

INVENTOR:
Lee Hunter Jr.,
By Carr & Carr & Gravely,
HIS ATTORNEYS.

Dec. 15, 1953 L. HUNTER, JR 2,662,396
WHEEL BALANCING DEVICE
Filed Aug. 11, 1949 6 Sheets-Sheet 4

INVENTOR:
Lee Hunter Jr.,
By Carr & Carr & Gravely,
HIS ATTORNEYS.

Dec. 15, 1953  L. HUNTER, JR  2,662,396
WHEEL BALANCING DEVICE
Filed Aug. 11, 1949  6 Sheets-Sheet 5

INVENTOR:
Lee Hunter Jr.,
By Carr & Carr & Gravely
HIS ATTORNEYS.

Dec. 15, 1953 — L. HUNTER, JR — 2,662,396
WHEEL BALANCING DEVICE
Filed Aug. 11, 1949 — 6 Sheets-Sheet 6

INVENTOR:
Lee Hunter Jr.,
By Carr & Carr & Gravely,
HIS ATTORNEYS.

Patented Dec. 15, 1953

2,662,396

UNITED STATES PATENT OFFICE 2,662,396

WHEEL BALANCING DEVICE

Lee Hunter, Jr., University City, Mo.

Application August 11, 1949, Serial No. 109,641

6 Claims. (Cl. 73—66)

1

This invention relates to devices for balancing rotary bodies, such as automobile wheels. The principal object of the invention is to provide a device that can be easily carried by hand and readily mounted as a complete unit on a wheel for rotation therewith to quickly and accurately determine the amount of unbalance thereof, and the location and amount of weight required to counterbalance such unbalance without dismounting the wheel from the automobile. Other objects of the invention are simplicity and cheapness of construction, compactness of design, and lightness of weight.

The invention consists in the wheel assembly device and in the parts and combinations and arrangement of parts hereinafter described and claimed.

2

The preferred embodiment of the device is shown in Figs. 1-19 for determining the unbalance of an automobile wheel A and the location and amount of weight required to correct such unbalance and comprises a cage 7 (Figs. 9-18) having a circular outer end wall 8, an annular inner end wall 9 concentric with said outer end wall, two diametrically opposite longitudinal bridges 10 and 11 integrally connecting said outer and inner end walls in axially spaced relation, and a circular plate 12 secured by flatwise screws 13 to an outstanding annular rib 14 formed on the outer end face of said annular end wall around the inner periphery thereof. The end closure plate 12 extends radially outwardly of the annular rib 14 and forms therewith and with the annular inner end wall 9 of the cage 7 a peripheral annular groove 15 therein in which is rotatably supported a gear ring 17 which is riveted to a cup-shaped mounting disc 16 of considerably larger diameter than said inner wall and opens away therefrom. The annular inner end wall 9 of the cage 7 has a rim flange 18 extending in the direction of the outer end wall 8 of said cage; and said cage is provided with a cylindrical casing or cover 19 whose inner end seats on and is secured by screws 20 to said rim flange and whose outer end has an inturned annular flange 21 seating against the outer face of the outer end wall 8 of said cage. The cage 7 with its casing 19 forms a closed cylindrical housing and the rotary connection between the inner end of said housing and the cup-shaped mounting disc 16 permits relative rotary movement of said housing and disc.

Extending through an axial hole provided therefor in the inner end wall 9 of the cage 7 is a stud 22 having an annular shoulder 23 that abuts against the outer face of said wall and a threaded inner end portion on which is threaded a nut 24 for rigidly clamping said stud to said plate. Extending through cage 7 axially thereof is a shaft 25, one end of which is journaled in an axial bore 26 provided therefor in stud 22 and the other end of which has an operating knob 25a secured thereto some distance outwardly from the outer end wall 8 of said cage. Located within the cage is a worm 27 which is mounted on shaft 25 for rotation therewith adjacent to the supporting stud 22. The worm 27 intermeshes with a worm gear 28 (Fig. 15) fixed to a cross shaft 29 journaled near one end in a bearing 30 provided therefor on the longitudinal bridge 10 of said cage. At its opposite end the cross shaft 29 is journaled in a bearing 31 provided therefor in the annular inner end wall 9 of the cage 7 and is provided with a spur gear 32 that intermeshes with a spur gear 33 mounted on a shaft 34 supported radially of cage 7 in a bearing 36 formed on the inner face of the annular inner end wall 9 of said cage and a bearing 35 (Fig. 11) formed on the inner face of the rim flange 18 of said wall. The spur gear 33 rotates through an opening 37 which extends through the annular inner end wall 9 of the cage and opens into the annular peripheral groove 15 in the cage; and said gear intermeshes with a circular gear rack 38 cut in the disc 17 supported in said groove. By this arrangement, relative rotary movement is imparted to cage 7 and the mounting disc by manipulating the knob 25a fixed to the exposed outer end of shaft 25.

Journaled on shaft 25 is a tubular shaft 39 whose inner end terminates inside the cage 7 where it is provided with a spur gear 40 that intermeshes with a spur gear idler 41 journaled on a pin 42 secured in walls 8 and 9, a combination sleeve and bearing 43 spacing the gear 41 from wall 9. The spur gear idler 41 meshes with another spur gear idler 44 journaled on a pin 45 secured in end walls 8 and 9 parallel to pin 42. The gear 44 is spaced from wall 9 by a combination sleeve and bearing 46. The gear 44 meshes with a gear 47 integral with worm gear 27, each being suitably secured to shaft 25 by means of a pin 48. The tubular shaft 39 extends outwardly beyond the outer end of the cage 7 where it is provided, just inwardly of the operating knob 25a, with an operating knob 39a. By this arrangement relative rotary movement may be imparted to the cage and ring gear 17 by means of knob 25a as well as by means of the knob 39a.

Journaled on the tubular shaft 39 is a tubular shaft 49 terminating inside of cage 7 in worm 50 that intermeshes with a worm gear 51 fixed to a cross shaft 52 journaled in bearings 53 provided therefor in the bridge member 11 of the cage. The tubular operating shaft 49 extends beyond the outer end wall 8 of cage 7 and has an operating knob 49a fixed thereto just inwardly of the operating knob 39a for the operating shaft 39.

Fixed to the cross shaft 52 is a beveled pinion 54 that intermeshes continuously with two beveled gears 55 and 56, respectively. The beveled gear 55 is fixed to a shaft 57 and the beveled gear 56 is fixed to a tubular shaft 58 journaled on shaft 57, both shafts being disposed alongside of the tubular shaft 49 in spaced parallel relation thereto. The shaft 57 is supported at one end in a bearing 59 provided therefor in the outer end wall 8 of the cage 7. At the other or inner end of the cage the shafts 57 and 58 extend through a bushing 60 in a hole in the end wall 9 of the cage. The tubular shaft 58 projects beyond the end wall 9 and has a spur gear 61 fixed thereto having a hub 61a abutting the bushing 60 mounted in the end wall 9. The shaft 57 also has a spur gear 62 secured thereto outwardly of and of the same size as spur gear 61 secured to the tubular shaft 58.

Rotatable on the tubular operating shaft 49 and in the central opening in the outer end wall 8 of the cage is a tubular operating shaft 63 provided just inside of said cage with a spur gear 64. The shaft 63 extends outside of the cage and an operating knob 63a is secured to the outer end of said shaft between the outer end wall of said cage and the operating knob 49a for the tubular operating shaft 49. The spur gear 64 meshes with a spur gear idler 65 (Fig. 12) journaled on pin 42 and is held in axially spaced relation on said pin from gear 41. A sleeve 66 and a combination sleeve and bearing 67 spaces gear 65 from the end wall 8 and from gear 41. The spur gear idler 65 meshes with spur gear idler 68 journaled on pin 45 and is held in axially spaced relation with respect to gear 44 by a sleeve 69, and a combination sleeve and bearing 70 spaces gear 68 from the end wall 8. The spur gear idler 68 meshes with spur gear 71 that is disposed adjacent to and integral with the worm 50 on shaft 49.

The knob 25a is locked to shaft 25 by suitable screws and the other knobs are held in spaced relation by abutting the adjacent knob and a shoulder on the shaft on which the knob is carried. The bores of knobs 39a, 49a and 63a have a flat surface thereon engaging a cooperating flat surface on the respective shafts for preventing relative rotation between the knobs and the shafts.

A member 72 is disposed between the spur gear 40 and worm 50 on the hollow shaft 39 and pin 42 and its associated sleeve 66 and is used as a torque plate for separating worm 50 and gear 40 and preventing the actuation of one gear by the other gear.

Journaled on the central stud 22, between the flange on the flange screw 73 therein and the outer face of the end wall 9 of the inner end of cage 7, are two separate arms 74 and 75 disposed radially of said cage inside of the cup-shaped mounting disc 16 at said end of the cage and terminating at their respective outer ends in weights 76 and 76a (Fig. 7) of the same size and shape. The weight arm 74 is provided with an arcuate gear rack 77 disposed concentric to the supporting stud or pivot 22 therefor and intermeshes with the spur gear 61 on the tubular countershaft 58; and the weight arm 75 is provided with a similar arcuate rack 78 that intermeshes with the spur gear 62 on the solid countershaft 57. Secured to the weight arm 74 that intermeshes with the spur gear 61 on the tubular countershaft 58 is a pointer 79 offset laterally to extend through an arcuate slot 80 in the end wall 9, and thence radially outwardly to form an angle and a point directly inside of a transparent window 81 in cover 19. The pointer 79 has a projection 79a extending into an aperture 74b in arm 74 for preventing relative rotation therebetween. The arcuate slot 80 is of sufficient length to accommodate an 80 degree relative rotary movement of the pointer 79 and the cage 7; and the window 81 in casing 19 has a scale 82 marked thereon along one arc of the pointer and graduated in ounces and fractions thereof. The cage casing 19 also has a longitudinal counterweight locating mark 83 on the outer peripheral surface thereof, said mark being located in a plane disposed radially of cage 7 and passing through the axes of countershafts 57 and 58 and the axis of shaft 25 for swinging weight arms 74 and 75 about the axis of the cage 7.

The cup-shaped mounting disc 16 (Figs 1-7) is provided with four circumferentially spaced mounting fingers 84 extending radially thereof through slots 85 in the outer peripheral wall of said disc just inwardly of a curled rim portion 86 thereof. Each of these fingers 84 is in the form of a flat plate provided with an indentation 87 engageable with a wall of slot 85 for limiting radial inward movement. Each of the fingers 84 is slidably mounted in a U-shaped bracket 88 whose base is suitably secured to disc 16, as by riveting, the plate being located in slots in the legs 89 and 90 of the bracket 88. The leg 90 is provided with a flange 91 to which a member 92 is secured by means of screws 93 extending through slots in the member, the slots permitting adjustment of the member. The member 92 is bent to follow the contour of flange 91 and leg 90 and has a pointer 94 thereon that cooperates with a scale 95 cut into the upper face of finger 84, the scale being marked in fractions of inches for correctly adjusting the diameter of the wheel balancer so that it may be quickly and accurately assembled in a wheel to be tested. Radial adjustment of the finger 84 is accomplished in two steps, one large and one small adjustment. A lead screw 96 is positioned between legs 89 and 90 of the bracket 88 and is rotatably mounted therein, a knob 97 being secured thereon for facilitating the rotation of the screw. A traveler 98 is threaded onto screw 96 and has a slot 99 therein in which one edge of finger 84 is received. The traveler has a second slot 100 therein and a pull-pin 101 is slidably received in suitable apertures cut in the jaws defining the slots. The pull-pin 101 is held in its lowermost position by spring 102 located in slot 100 and about the pin. The end of the pin remote from its head extends through apertures 103 cut in each finger 84. Two apertures 103 are shown but more may be provided, each making possible a major radial adjustment of the finger 84 as, for instance, a 15 or 16 inch wheel. The screw 96 makes possible a radial adjustment less than the distance between apertures 103. By a combination of these adjustments a wide range of radial movement of the finger 84 is possible, thereby readily adapting the wheel balancer to any type and size of wheel.

The parts within the cage 7 and the casing 19 rotate during a balancing operation and in order that this portion of the device may be in balance, a weight 104 (Fig. 13) is provided that is secured to an arm 105 fastened to bridge 10. A guard plate 106 is installed within the cup-shaped disc 16 for enclosing the weights 76, 76a and the weight arms 74 and 75 respectively. The plate prevents possible injury to the operator as well as preventing damage to the weights and to the weight arms, thereby preserving the accuracy of the wheel balancing device.

Figures 15, 20, 21, 22:
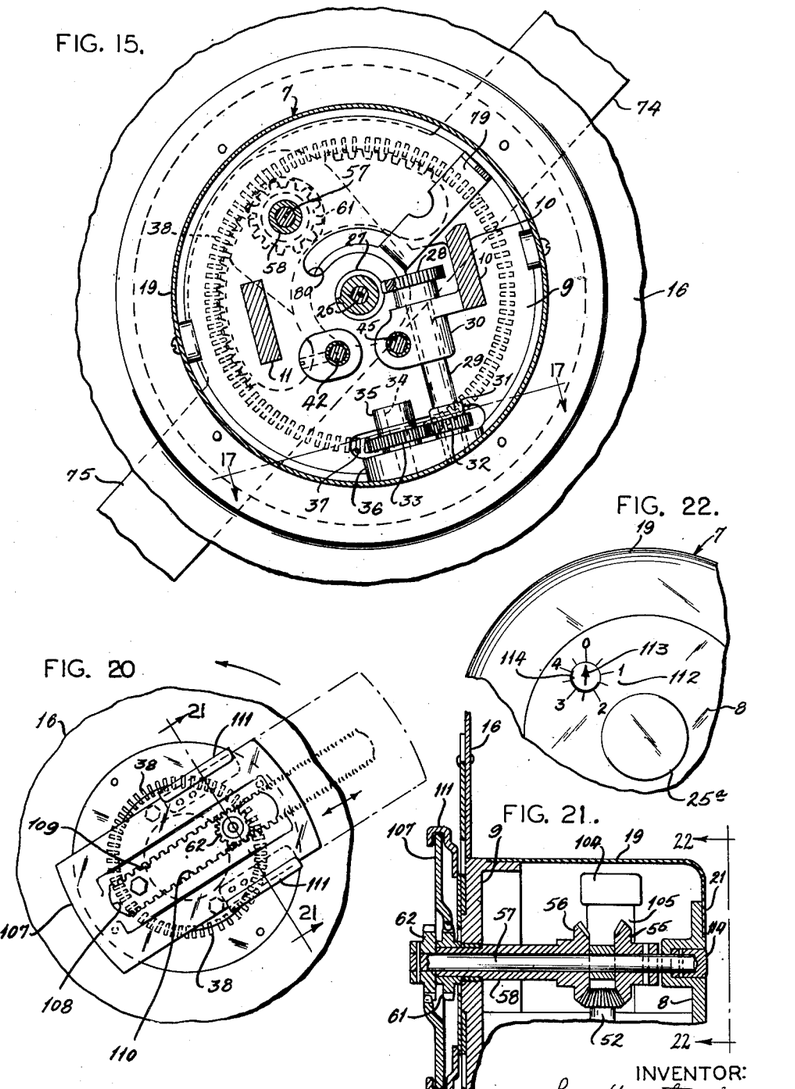
Fig. 15 is a sectional view taken along the line 15—15 of Fig. 11.
Fig. 20 is a plan view of a modified form of balancing weight.
Fig. 21 is a sectional view taken along the line 21—21 in Fig. 20.
Fig. 22 is a plan view of the pointer and balancing weight indicia looking in the direction of line 22—22 of Fig. 21.
Figures 16, 17:
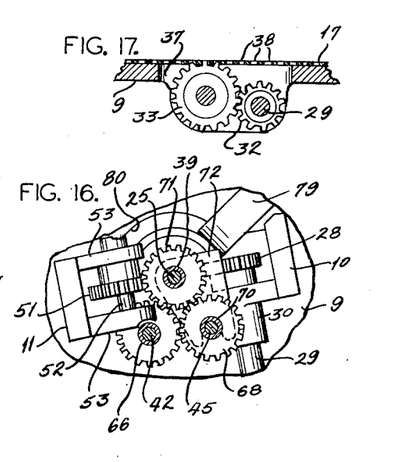
Fig. 16 is a sectional view taken along the line 16—16 of Fig. 11.
Fig. 17 is a sectional view taken along the line 17—17 of Figs. 7 and 15.

A modified form of the invention is illustrated in Figs. 20 through 22 of the drawings in which the motion transmitting means from the weights to knobs 49a and 63a is the same as that shown in the preferred embodiment but in which a radially movable counterweight in the form of a plate 107 is employed. The plate is provided with a slot 108, the longitudinal edges of which are displaced so that gear teeth 109 cut in one edge, mesh with gear 61, and gear teeth 110 cut in the other edge mesh with gear 62. Selective rotation of knobs 49a and 63a moves plate 107 radially with respect to the balancing device. The plate 107 is slidably mounted in ways 111 carried by the end wall 9 and is rotated by knobs 25a and 39a. Suitable indicia 112 for indicating the amount of unbalance of the wheel is engraved on the wall 8 and a pointer 113 is provided on an extension 114 on shaft 57 for indicating the amount of the balancing weight to be attached to the wheel. This means of Fig. 22 also indicates by its position circumferentially of the axis of the knobs the place on the wheel where the balancing weight should be attached. In other words, the radial outward location of the shaft extension 114 relative to the center of wall 8 can be used to point out the proper location on the wheel for the indicated weight, such that in Fig. 22, the position of extension 114 indicates the weight should be placed upwardly to the left of a vertical line through the center of knob 25a. This is similar to index 83 of Fig. 8.

Means have been provided for preventing the jamming of gears 61 and 62 in the gear slots cut in weight arms 74, 75 and in plate 107. The gear 55 (Figs. 9 and 13) has an arm 115 secured thereto and provided with a hardened screw 116 engageable with a pin 117 secured to gear 64. These gears are so related that arm screw 116 will be engaged by pin 117 just before gears 61 and 62 reach the end of travel in the slots of the weight arms 74, 75 and plate 107, thereby preventing further rotation of knobs 49a and 63a and the parts connected thereto.

Figure 1:
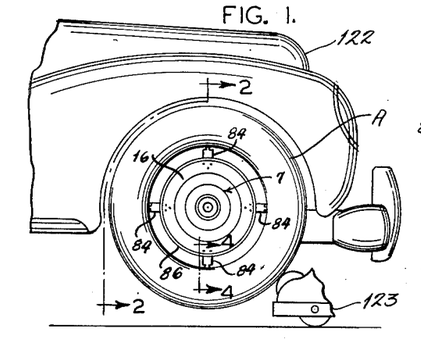
Fig. 1 is a side elevational view of one side of the front end of a motor vehicle showing the improved wheel balancer installed thereon.
Figures 2, 4, 5, 6:
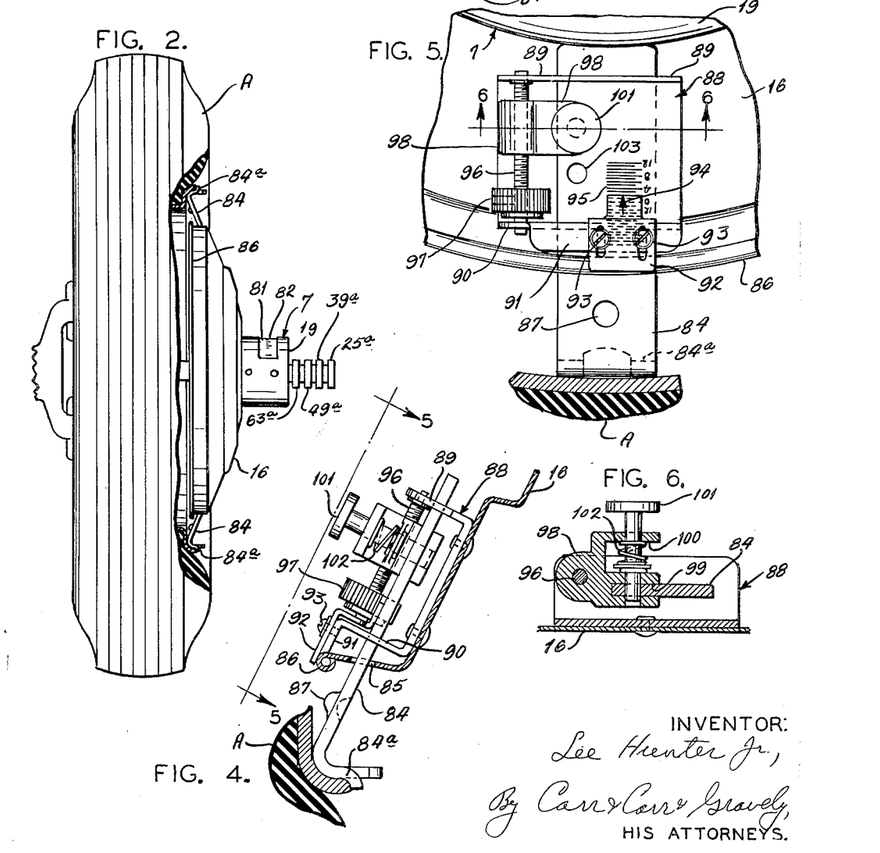
Fig. 2 is an edge view of an automobile wheel, partly in section, and taken along the line 2—2 of Fig. 1.
Fig. 4 is a sectional view taken along the line 4—4 of Fig. 1.
Fig. 5 is a plan view of a wheel attaching member looking in the direction of the line 5—5 of Fig. 4.
Fig. 6 is a sectional view taken along the line 6—6 of Fig. 5.
Figure 3:
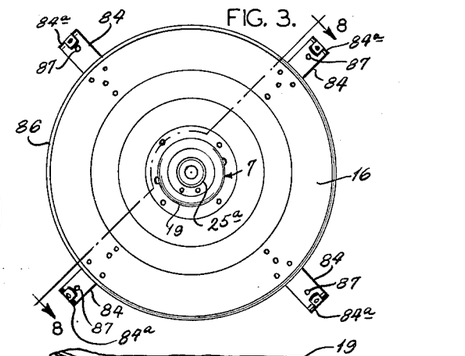
Fig. 3 is a front view of the wheel balancer.
Figure 7:
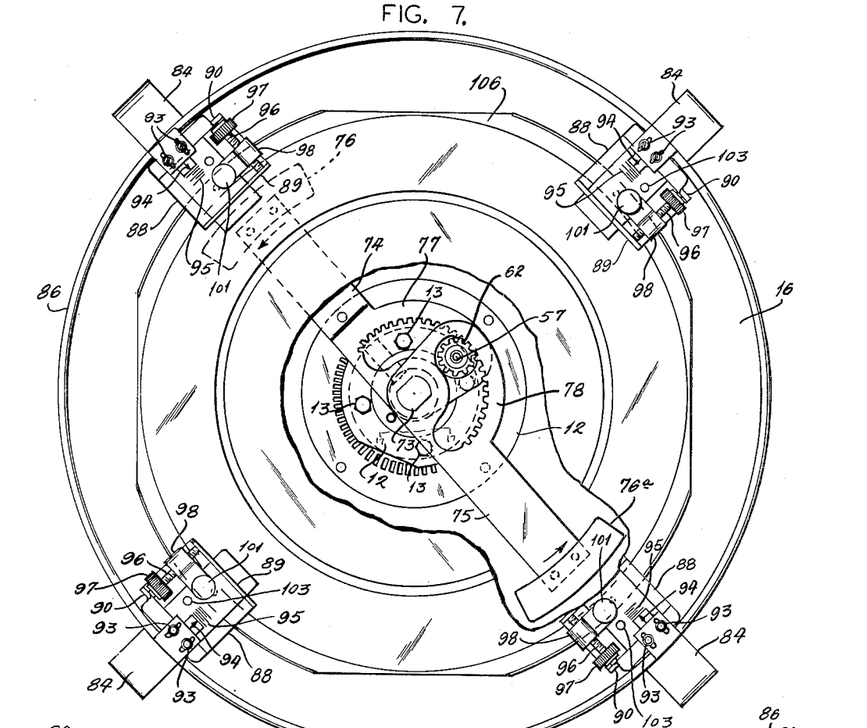
Fig. 7 is an enlarged rear view of the improved wheel balancer with parts omitted for showing detail.
Figures 8, 18:
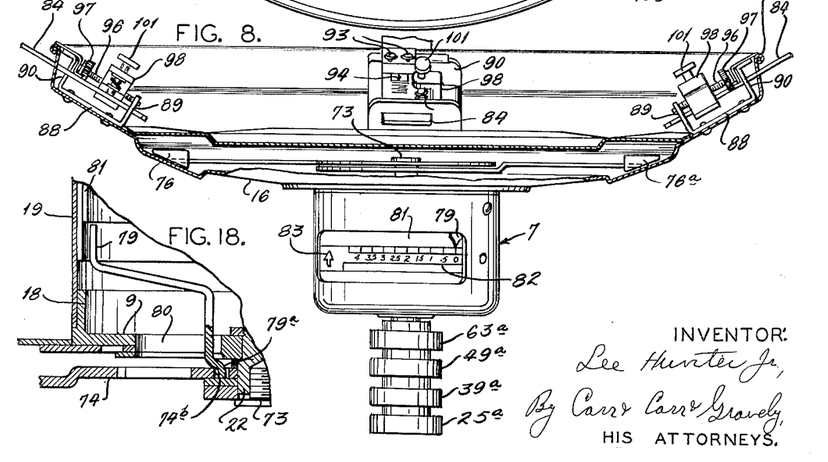
Fig. 8 is an enlarged sectional view taken along the line 8—8 of Fig. 3.
Fig. 18 is an enlarged detail view showing the balancing weight pointer assembled in the adjusting mechanism.
Figure 9:
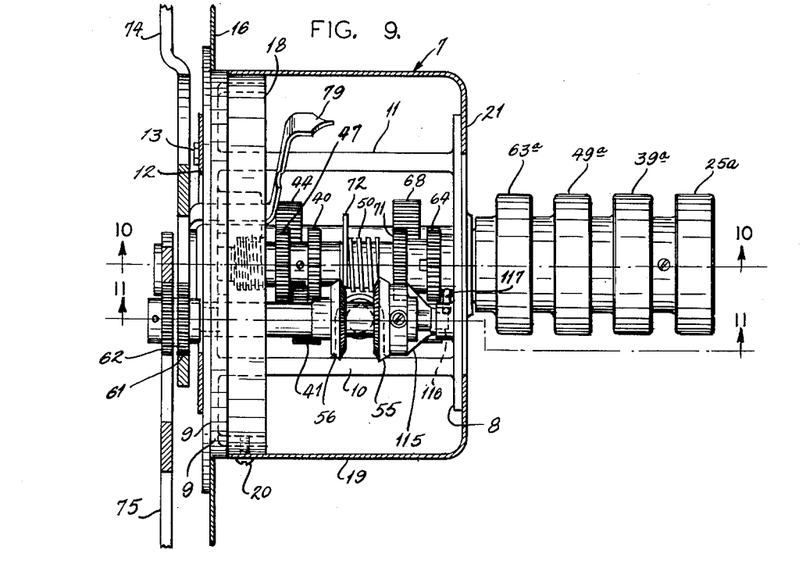
Fig. 9 is a side elevational view, partly in section, of the balancing weight adjusting means.
Figure 10:
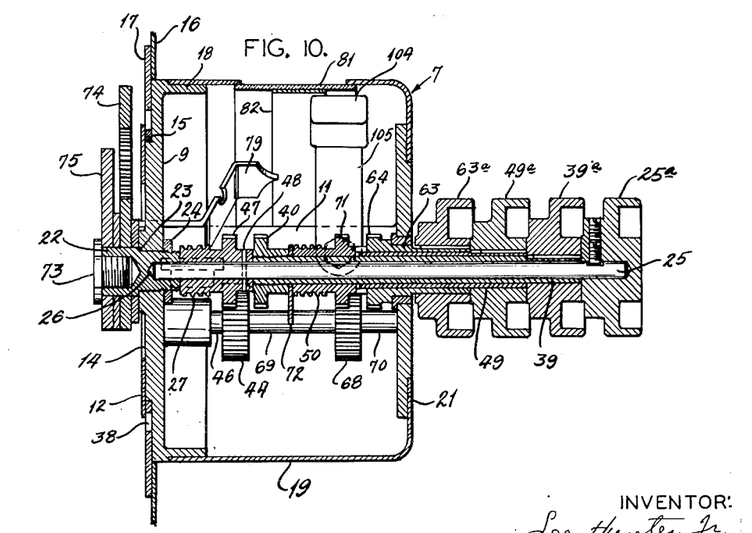
Fig. 10 is a sectional view taken along the line 10—10 of Fig. 9.
Figures 11, 19:
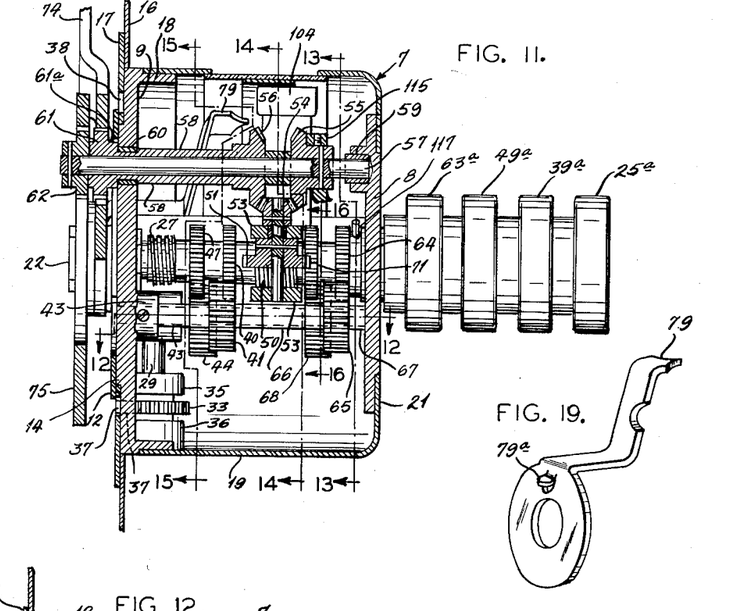
Fig. 11 is a sectional view taken along the line 11—11 of Fig. 9.
Fig. 19 is an enlarged perspective view of the pointer.
Figure 12:
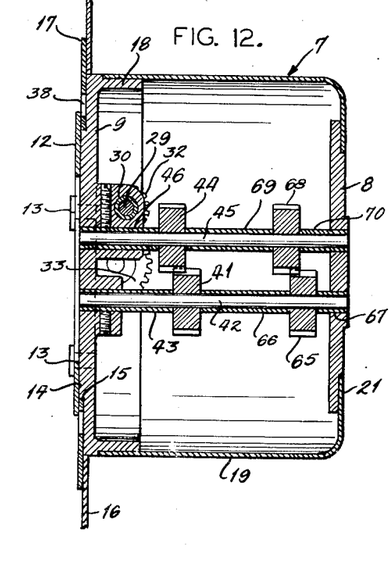
Fig. 12 is a sectional view taken along the line 12—12 of Fig. 11.
Figures 13, 14, 23:
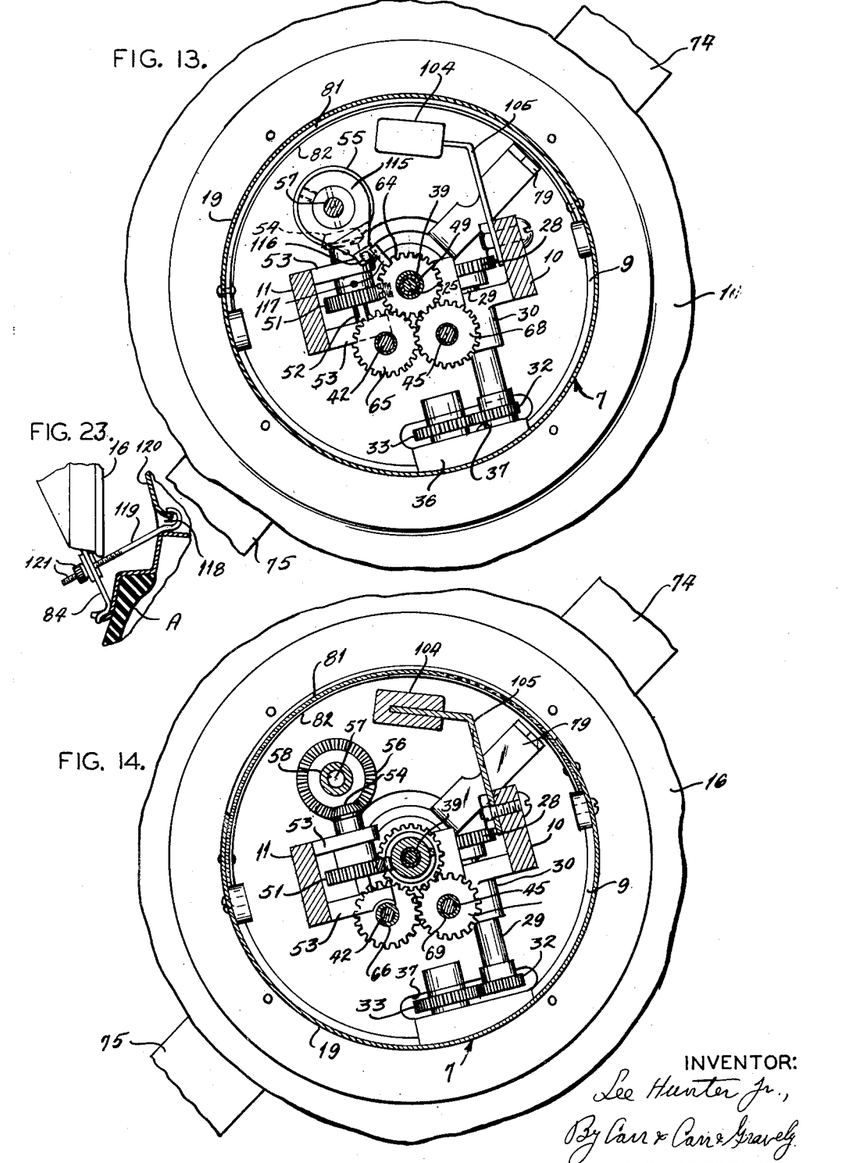
Fig. 13 is a sectional view taken along the line 13—13 of Fig. 11.
Fig. 14 is a sectional view taken along the line 14—14 of Fig. 11.
Fig. 23 is a sectional view of a modified form of balancing device attaching means.

A modified form of holding means for the finger 84 is shown in Fig. 23 in which a hook 119 is placed in the chain slot 118 of wheel A that engages the spider 120, the hook being threaded at one end, the threaded end extending through an aperture in finger 84 and clamped thereto by a nut 121. This hook is employed on all wheels having chain slots therein or other formation in which they can be inserted.

When it is desired to balance the automobile wheel A, the hereinbefore described balancing device is mounted on said wheel on vehicle 122 concentric therewith by placing the cup-shaped mounting disc 16 opposite the outer face of the wheel and seating the curved ends of the mounting finger 84 of said disc in the concave annular depression formed in the outside face of the wheel rim by the outwardly curved peripheral outside marginal rim flange of the rim thereof, said finger having been previously adjusted for the rim diameter of the wheel. The ends of the mounting fingers 84 are then positioned on the rim flanges of the wheel, the curved ends 84a fitting against the curve in the wheel rim. By this arrangement the entire balancing device, including the cage 7, mounting disc 16, and balancing weights 76 and 76a, is secured to the wheel concentric therewith for rotation about the axis thereof. One of the knobs 49a, 63a is then turned to move the balancing weights 76 and 76a relative to one another into a slidably unbalanced position, such that both weights are in a position, say with the pointer 79 at the 1½ oz. position on the scale 82. The weights move away from each other when one knob is turned and toward each other when the other knob is turned. The wheel with the balancing device mounted thereon is then jacked up and rotated on its axis, each of the front wheels being rotated by means of a suitable power driven spinner 123 engaging the tread of the tire on wheel A, and the rear wheels being driven from the engine of the automobile.

With the balancing device adjusted and mounted on the wheel in the manner above described, the magnitude and location of the weight required to correct the running or dynamic unbalance of the wheel can be found by spinning the wheel at a speed at which such unbalance will produce considerable vibration and be observed visually or by sense of touch, then holding the knob 49a or 63a until such vibration is reduced to a minimum, and then holding the knob 25a or 39a until no vibration is produced by the rotating wheel. The wheel is then stopped and a mark noted on the wheel rim in alignment with arrow 83 thus indicating that the counterweight for correcting the unbalance of the wheel should be attached to the rim at that point, while the radial pointer 79 indicates on the scale 82, the magnitude of such correction weight. A correction weight of the magnitude indicated on the scale 82 is then applied to the outside flange of the wheel rim at the point indicated by the pointer to thereby correct the unbalance of the wheel. The balancing device is then removed from the wheel by disengaging the curved ends 84a of finger 84 from the rim thereof. Stopping or slowing down the rotation of knob 25a with the rotating wheel, produces relative rotary movement of said wheel and the two balancing weights 76 and 76a in one direction; and stopping or slowing down the rotation of knob 39a produces relative rotary movement of said wheel and balancing weights in the opposite direction. Thus, by manipulating knobs 25a and 39a, the cage 7 and the weights 76 and 76a may be rotated in either direction as a unit relative to the rotating wheel and the mounting disc 16 fixed thereto so that when the vibration of the rotating wheel is reduced to a minimum, both weights are located on the side of the wheel opposite the heavy spot therein and are located on opposite sides of and equally distant from a diametrical line passing through the heavy spot of the wheel. Stopping or slowing down the rotation of one of the two knobs 49a and 63a with the rotating wheel causes the two rotating weights 76 and 76a to move equal distances toward one another, thereby increasing the effective counterweight; and a similar manipulation of the other of said knobs causes said weight to move equal distances away from each other for increasing the counterbalancing effect thereof. When the weights 76 and 76a are diametrically opposite each other, they are in equilibrium and have no counterbalancing effect on the wheel; and when they are swung together they provide a maximum counterbalancing effect.

The operation of the device illustrated in Figs. 20 through 22 of the drawings is similar to that described in the preferred embodiment of the invention. The plate 107 being moved off center in ways 111 and then rotatably adjusted on the gear ring 17, will point the position at which the counterweight is to be applied to the rim.

From the foregoing it is obvious that the hereinbefore described wheel balancing device is light, strong, durable, compact and simple as well as economical to manufacture. The device can be easily carried by the hand and readily mounted on and dismounted from the wheel as a complete self-contained unit. The location and magnitude of the correction weight required to balance the wheel can be quickly and easily determined merely by lightly gripping the different readily accessible central knobs of the unit as it rotates with the wheel.

Obviously, the hereinabove described balancing device admits of considerable modification without departing from the invention. Therefore, I do not wish to be limited to the precise construction shown and described.

What I claim is:

1. A device for correcting the dynamic unbalance of a rotating wheel comprising a frame structure carried by the rotating wheel, a housing on said frame movable relative thereto, two balancing weights movably carried on said housing, separate balancing weight adjusting control means coaxial with the axis of wheel rotation located adjacent said housing, a first gear train in said housing continuously connecting one of said control means with said balancing weights for adjusting said weights relative to each other comprising spur, worm and bevel gearing for reversely adjusting the weights, a second gear train in said housing continuously connecting another of said control means with said frame for adjusting said housing and weights as a unit relative to said frame comprising spur and worm gearing for moving the weights as a unit, said control means being fixed against axial displacement while rotating during wheel balancing and being controllable solely by a change in speed relative to wheel speed, a pin in one of the spur gears in said first gear train; and an arm secured to another gear in said train and being adapted to engage said pin for arresting the motion in said train.

2. A device for correcting the dynamic unbalance of a rotating wheel comprising a frame structure carried by the rotating wheel, a housing located on the outside of said frame and having a portion disposed within said frame, said housing being movable relative to said frame, two balancing weights movably carried on said housing portion within the frame structure, separate balancing weight adjusting control means coaxial with the axis of wheel rotation located adjacent said housing, a first gear train consisting of spur, worm and bevel gearing in said housing continuously connecting some of said control means with said balancing weights for reversely adjusting said weights relative to each other, and a second gear train in said housing consisting of spur and worm gearing continuously connecting another of said control means with said frame for adjusting said housing and weights as a unit relative to said frame, said control means being fixed against axial displacement while rotating during wheel balancing and being controllable solely by a change in speed relative to wheel speed, a pin in one of the spur gears in said first gear train; and an arm secured to another gear in said train and being adapted to engage said pin for arresting the motion in said train.

3. A device for use in determining and correcting the dynamic unbalance in a rotating wheel comprising a frame carried by the rotating wheel, a housing mounted on said frame at the outside thereof, said housing having a portion projecting inwardly of said frame for rotationally connecting said housing with said frame, a pair of balancing weights carried by the inwardly projecting portion of said housing for rotation therewith as a unit, and to move relative to said housing for angular movement relative to each other, first rotary control means extending from said housing coaxially of the wheel axis, a first gear train consisting of spur, worm and bevel gearing in said housing directly connecting said first control means at all times with said balancing weights to reversely effect said angular movement thereof relative to each other, second rotary control means extending from said housing also coaxially of the wheel axis, and a second gear train consisting of spur and worm gearing in said housing directly connecting said second control means at all times with said frame to effect rotary movement of said housing and balancing weights as a unit relative to said frame, said rotary control means and connected gear trains being fixed against axial displacement and said control means being effective solely upon a change in rate of rotation to a speed different from the speed of rotation of the wheel, a pin in one of the spur gears in said first gear train; and an arm secured to another gear in said train in position to engage said pin for arresting the motion in said train.

4. A device for determining and correcting the dynamic unbalance in a rotating wheel comprising a frame carried by the rotating wheel, a housing on said frame mounted to rotate with and relative to said frame, a pair of balancing weights carried by said housing to rotate as a unit therewith and to be movable angularly relative to each other, first rotary control means extending from said housing coaxially with the wheel, a first gear train consisting of spur and worm gearing in said housing at all times directly connecting said first control means with said frame to rotate said housing and weights as a unit in either direction relative to said frame, second rotary control means independent of said first control means and arranged coaxial with said first control means, a second gear train consisting of bevel, worm and spur gearing independent of said first gear train in said housing at all times directly connecting said second control means with said balancing weights to move said weights angularly relative to each other to increase and decrease the angle included therebetween during rotation with said housing, all of said rotary control means being fixed against axial displacement and being rendered effective solely upon a change in rate of rotation to a rate different from that of the wheel rotation, a pin carried with a spur gear in said second train; and an arm carried with a different gear of said second train and engageable with the pin for limiting motion in said second gear train.

5. A device for determining and correcting the dynamic unbalance in a rotating wheel comprising: a frame removably mounted on the wheel to rotate therewith; a housing carried on said frame to rotate with and relative to said frame; a pair of balancing weights carried by said housing normally to rotate as a unit with said housing and frame; a first pair of rotary control means adjacent said housing in the axis of wheel rotation, said first control means being fixed against axial movement; a first reversible gear train consisting of spur and worm gearing in said housing directly connecting said first pair of control means with said frame at all times, one of said first pair of control means effecting rotation through said first gear train of said housing and balancing weights as a unit relative to said frame in one direction, and the other one of said first pair of control means effecting a reverse direction of rotation through reversibility of said first gear train of said housing and balancing weights as a unit relative to said frame; a second pair of rotary control means coaxial with said first pair, said second control means being fixed against axial movement; a second reversible gear train consisting of spur, bevel and worm gearing in said housing directly connecting said second pair of control means with said balancing weights at all times, one of said second pair of control means effecting angular movement through said second gear train of said balancing weights relative to each other, and the other one of said second pair of control means effecting a reverse relative angular movement between said balanacing weights through reversibility of said second gear train, a pin in one of the spur gears in said second gear train; and an arm secured to another gear in said second gear train in position to engage said pin for arresting the motion in said second gear train.

6. A device for determining and correcting the dynamic unbalance of a rotating wheel comprising a mounting disk carried by and adjacent one face of the wheel and coaxially rotating therewith, a housing carried on said disk coaxially with the wheel and rotatable both with and relative to said disk, a pair of weighted balancing arms pivotally connected with said housing, a first train of constantly meshing spur and worm gears in said housing including a gear driving said housing relative to said disk, a second train of constantly meshing spur, worm and bevel gears in said housing including a pair of coaxial countershafts extending from said housing into the plane of said weighted arms and a gear on each shaft connected with one of said arms, rotation of said countershaft gears oppositely moving said arms about said pivot connection, coaxially arranged pairs of shafts connected with said trains of gears, each pair of shafts being connected at all times into a different one of said trains of gears, control knobs for each shaft of said pairs of shafts, said knobs being solely rotationally manipulative with respect to the direction of wheel rotation to actuate the train of gears connected thereto, said first train of gears driving said housing relative to said disk also carrying said second train of gears therewith including said countershafts and weighted arms connected thereto, a pin in one of the spur gears of said second train; and an arm carried by a different spur gear of said second train, said arm being adapted to engage said pin for arresting the motion of the gear train.

LEE HUNTER, Jr.

References Cited in the file of this patent

UNITED STATES PATENTS

| Number | Name | Date |
|---|---|---|
| 1,296,732 | Akimoff | Mar. 11, 1919 |
| 1,313,039 | Akimoff | Aug. 12, 1919 |
| 1,876,526 | Thearle et al. | Sept. 6, 1932 |
| 1,876,527 | Thearle et al. | Sept. 6, 1932 |
| 2,241,637 | Ernst et al. | May 13, 1941 |
| 2,341,444 | Hunter | Feb. 8, 1944 |
| 2,372,891 | Fenton | Apr. 3, 1945 |
| 2,402,041 | Greenleaf et al. | June 11, 1946 |
| 2,441,152 | Kelleher | May 11, 1948 |